US011372313B2

(12) United States Patent
Shirotori et al.

(10) Patent No.: US 11,372,313 B2
(45) Date of Patent: Jun. 28, 2022

(54) LENS UNIT

(71) Applicant: NIDEC SANKYO CORPORATION, Nagano (JP)

(72) Inventors: Toshio Shirotori, Nagano (JP); Tomoaki Nakajima, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/652,110

(22) PCT Filed: Sep. 11, 2018

(86) PCT No.: PCT/JP2018/033539
§ 371 (c)(1),
(2) Date: Mar. 30, 2020

(87) PCT Pub. No.: WO2019/065201
PCT Pub. Date: Apr. 4, 2019

(65) Prior Publication Data
US 2020/0310225 A1     Oct. 1, 2020

(30) Foreign Application Priority Data

Sep. 29, 2017   (JP) .............................. JP2017-189367

(51) Int. Cl.
*G03B 17/08*     (2021.01)
*G02B 7/02*      (2021.01)
*G02B 9/62*      (2006.01)

(52) U.S. Cl.
CPC ............. *G03B 17/08* (2013.01); *G02B 7/021* (2013.01); *G02B 7/026* (2013.01); *G02B 9/62* (2013.01)

(58) Field of Classification Search
CPC ........ G03B 17/08; G03B 17/00; G03B 17/02; H04N 5/2252; H04N 5/2254; H04N 5/225;
(Continued)

(56) References Cited

U.S. PATENT DOCUMENTS 5,894,369 A * 4/1999 Akiba ..................... A61B 1/127
                                                      359/820
6,507,700 B1 * 1/2003 Takekuma ........... H04N 5/2252
                                                       396/25
(Continued)

FOREIGN PATENT DOCUMENTS

JP          10090578 A     4/1998
JP        2005107214 A     4/2005
(Continued)

OTHER PUBLICATIONS

International Search Report corresponding to Application No. PCT/JP2018/033539; dated Nov. 13, 2018.

*Primary Examiner* — Clayton E. LaBalle
*Assistant Examiner* — Fang-Chi Chang
(74) *Attorney, Agent, or Firm* — Cantor Colburn LLP (57) ABSTRACT

A lens unit may include lenses and a holder in a tube shape which holds the lenses on an inner side such that in the lenses, a side face of a first lens located on a most object side may include a first side face part which is extended from an outer edge of a first face that is an object side face of the first lens toward an image side, a second side face part which is extended from an object side toward the image side on the image side with respect to the first side face part and an outer side in a radial direction with respect to the first side face part; and a third side face part which connects an image side end part of the first side face part with an object side end part of the second side face part.

7 Claims, 8 Drawing Sheets

(58) Field of Classification Search
CPC .... H04N 5/2251; H04N 5/22541; G02B 7/02; G02B 7/021; G02B 7/025; G02B 7/00; G02B 7/026; G02B 9/62
See application file for complete search history.

(56) References Cited

U.S. PATENT DOCUMENTS

| | | | |
|---|---|---|---|
| 2004/0223074 A1* | 11/2004 | Takada | G02B 9/62 |
| | | | 348/360 |
| 2009/0244734 A1* | 10/2009 | Sasaki | G02B 7/026 |
| | | | 359/830 |

FOREIGN PATENT DOCUMENTS

| | | | |
|---|---|---|---|
| JP | 2008233414 A | 10/2008 | |
| JP | 2009157121 A | 7/2009 | |
| JP | 2009282071 A | 12/2009 | |
| JP | 2010197877 A | 9/2010 | |
| JP | 2016071367 A | 5/2016 | |
| JP | 2016102924 A | 6/2016 | |
| JP | 2017053943 A | 3/2017 | |

\* cited by examiner

LENS UNIT

CROSS REFERENCE TO RELATED APPLICATION

This is the U.S. national stage of application No. PCT/JP2018/033539, filed on Sep. 11, 2018. Priority under 35 U.S.C. § 119(a) and 35 U.S.C. § 365(b) is claimed from Japanese Patent Application No. 2017-189367, filed on Sep. 29, 2017; the disclosures of which are incorporated herein by reference.

TECHNICAL FIELD

The present invention relates to a lens unit in which a plurality of lenses is held by a holder.

BACKGROUND ART

Figure 8:
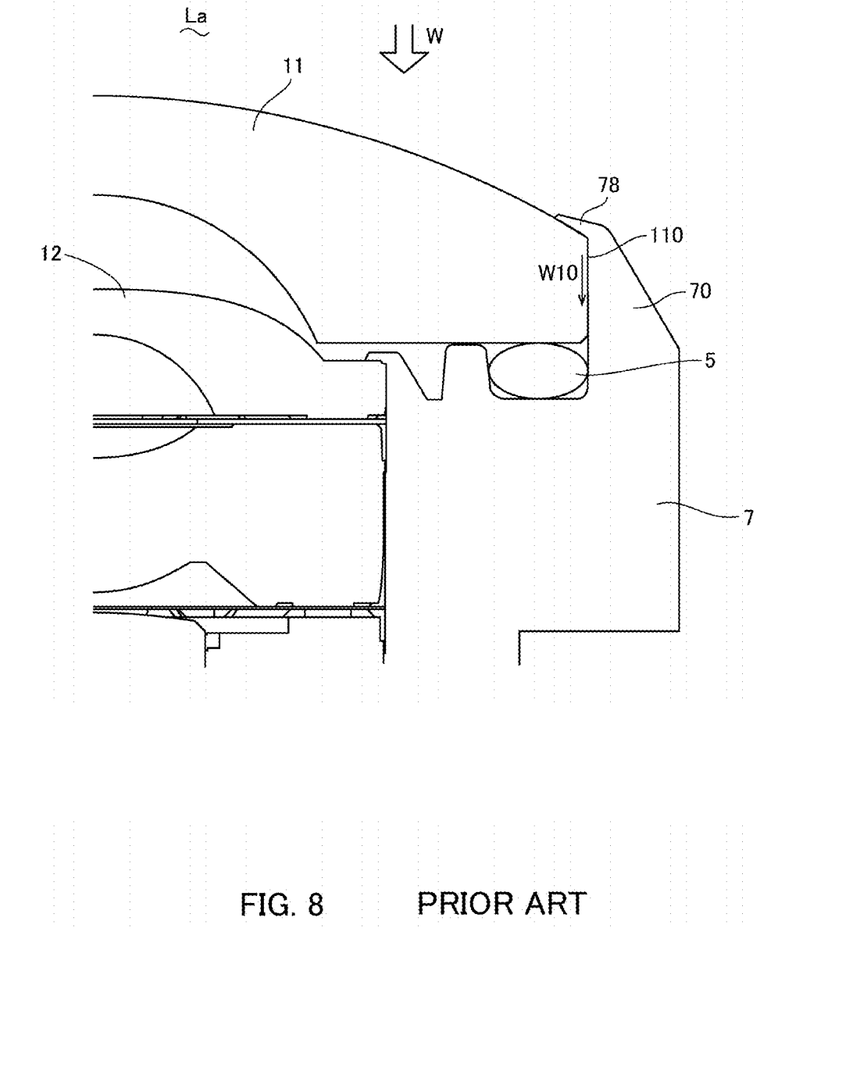
FIG. 8 is an explanatory view showing a lens unit in accordance with a reference example with respect to the present invention.

In a lens unit in which a plurality of lenses is accommodated in a holder made of resin, as shown in FIG. 8, a structure is sometimes adopted that, in the plurality of lenses such as a first lens 11 and a second lens 12, a seal member 5 is disposed between the first lens 11 located on the most object side "La" and the holder 7. Further, a structure is sometimes adopted that the holder 7 is provided with a first lens holding tube part 70 surrounding a periphery of the first lens 11 on an object side "La" with respect to the seal member 5 and a caulking rib (not shown) which is protruded to an object side from an end part on the object side of the first lens holding tube part 70 and, after the first lens 11 is disposed, the caulking rib is deformed by pressurizing while heating to form a caulked part 78 covering an outer peripheral side end part of the first lens 11 from an object side "La" (for example, see Patent Literature 1).

In a case of evaluating waterproofness of a lens unit, an evaluation is performed so that a high pressure water flow "W" is ejected to the first lens 11 from an object side "La". In the evaluation, as shown by the arrow "W10", even in a case that water enters from a space between the first lens 11 and the caulked part 78 into a space between a side face 110 of the first lens 11 and the first lens holding tube part 70, if an entered water amount is small, the water is blocked by the seal member 5.

However, when a high pressure water flow is ejected to the first lens 11 from the object side "La", there is a problem that a tip end side of the caulked part 78 may be damaged by the water pressure and water is easily entered from a space between the first lens 11 and the caulked part 78. Further, there is a problem that, when high pressure water enters between the first lens 11 and the caulked part 78, the water pressure acts on the caulked part 78 and the caulked part 78 may be deformed to an opening direction.

On the other hand, a structure has been proposed that a groove-shaped recessed part is formed on an object side face of a first lens 11 at a position separated from an outer edge of the first lens 11 to an inner side in a radial direction so as to extend along the outer edge and, after the recessed part is filled with a thermosetting adhesive, a caulked part 78 is formed (see Patent Literature 2).

CITATION LIST

Patent Literature

[PTL 1] Japanese Patent Laid-Open No. 2008-233414
[PTL 2] Japanese Patent Laid-Open No. 2009-157121

SUMMARY OF THE INVENTION

Problems to be Solved by the Invention

However, like the structure described in Patent Literature 2, in order to appropriately fill the groove-shaped recessed part provided in the first lens 11 with a thermosetting adhesive, an opening width of the recessed part is required to increase to some extent. Therefore, there is a problem that an outer side portion from a lens face of the first lens 11 is required to be enlarged. Further, in a case of the structure described in Patent Literature 2, the caulked part 78 is formed after the recessed part is filled with a thermosetting adhesive and thus, the thermosetting adhesive may be flowed out to a lens face side on the object side of the first lens 11. In addition, when a coating process and a hardening process of a thermosetting adhesive are performed, productivity is reduced.

In view of the problems described above, the present invention provides a lens unit which is capable of enhancing waterproof performance, in a plurality of lenses accommodated in a holder, between a first lens located on the most object side and the holder.

Solution to the Problems

To solve the above-mentioned problems, at least one embodiment of the present invention may provide a lens unit including a plurality of lenses and a holder in a tube shape which holds the plurality of lenses on an inner side. In the plurality of lenses, a side face of a first lens located on the most object side may be provided with a first side face part which is extended from an outer edge of a first face that is an object side face of the first lens toward an image side, a second side face part which is extended from an object side toward the image side on the image side with respect to the first side face part and an outer side in a radial direction with respect to the first side face part, and a third side face part which connects an image side end part of the first side face part with an object side end part of the second side face part. The holder which is made of light shielding resin may be provided with a first lens holding tube part which surrounds a periphery of the second side face part, and a caulked part which covers the third side face part of the first lens from the object side at an object side end part of the first lens holding tube part. An inner side end part in the radial direction of the caulked part may be located on the image side with respect to a virtual extended face which is obtained by extending the first face to the outer side in the radial direction.

In the lens unit in accordance with the present invention, a side face of the first lens may be provided with a third side face part between a first side face part, which is extended from an outer edge of an object side face (first face) of the first lens toward an image side, and a second side face part which is extended from the object side toward the image side on the image side with respect to the first side face part and on an outer side in the radial direction with respect to the first side face part. The holder may be provided with a caulked part which covers the third side face part from the object side at an object side end part of the first lens holding tube part surrounding a periphery of the second side face part. An inner side end part in the radial direction of the caulked part may be located on the image side with respect to a virtual extended face which is obtained by extending the first face to an outer side in the radial direction. Therefore, when a high pressure water flow is ejected to the first lens from the object side, the water flow flows to an outer side in the radial direction along the first lens face and the virtual extended face and thus, a situation is hard to occur that the water flow hits the inner side end part in the radial direction of the caulked part from an inner side in the radial direction with strong pressure. Accordingly, water is hard to enter between the side face of the first lens and the first lens holding tube part of the holder. Further, deformation to an outer side in the radial direction and damage due to the water pressure are hard to occur in the inner side end part in the radial direction of the caulked part. Therefore, waterproof performance between the first lens and the holder can be enhanced.

In at least one embodiment of the present invention, a structure may be adopted that the third side face part is formed to be an inclined face which is obliquely inclined with respect to an optical axis. According to this structure, when an end part of the first lens holding tube part is plastically deformed to form the caulked part, the caulked part is easily formed in a shape along a shape of the side face of the first lens.

In at least one embodiment of the present invention, a structure may be adopted that the inner side end part in the radial direction of the caulked part covers the first side face part from the outer side in the radial direction. According to this structure, when a high pressure water flow is ejected to the first lens from the object side, the water flow hardly hits the inner side end part in the radial direction of the caulked part with strong pressure. Further, the caulked part covers a side face of the first lens and thus, light causing stray light is hard to be incident on the first lens from the side face of the first lens.

In at least one embodiment of the present invention, a structure may be adopted that the inner side end part in the radial direction of the caulked part is protruded to the object side along the first side face part. According to this structure, light causing stray light is hard to be incident on the first lens from the side face of the first lens.

In at least one embodiment of the present invention, a structure may be adopted that the inner side end part in the radial direction of the caulked part is located at a position separated from the first side face part toward the outer side in the radial direction. Also in this structure, the inner side end part in the radial direction of the caulked part is located on the image side with respect to the virtual extended face which is obtained by extending the first face to an outer side in the radial direction. Therefore, when a high pressure water flow is ejected to the first lens from the object side, the water flow flows to an outer side in the radial direction along the first lens face and the virtual extended face and thus, a situation is hard to occur that the water flow hits the inner side end part in the radial direction of the caulked part from an inner side in the radial direction with strong pressure. Accordingly, deformation to an outer side in the radial direction and damage due to water pressure are hard to occur in the inner side end part in the radial direction of the caulked part.

In at least one embodiment of the present invention, a structure may be adopted that an adhesive is filled in a space between the inner side end part in the radial direction of the caulked part and the first side face part, and the adhesive is located on the image side with respect to the virtual extended face. According to this structure, water can be restrained from entering between a side face of the first lens and the first lens holding tube part of the holder by the adhesive. Further, the adhesive is located on the image side with respect to the virtual extended face and thus, when a high pressure water flow is ejected to the first lens from the object side, a situation is hard to occur that the water flow hits the adhesive from an inner side in the radial direction with strong pressure. Therefore, separation or the like of the adhesive is hard to occur.

In at least one embodiment of the present invention, a structure may be adopted that the adhesive has a light shielding property. According to this structure, an adhesive having a light shielding property covers a side face of the first lens and thus, light causing stray light is hard to be incident on the first lens from a side face of the first lens.

In at least one embodiment of the present invention, a structure may be adopted that a ring-shaped seal member is disposed between a second face which is an image side face of the first lens and the holder. According to this embodiment, even when some water enters between a side face of the first lens and the first lens holding tube part of the holder, the water can be prevented from entering by the seal member.

Effects of the Invention

In the lens unit in accordance with the present invention, a side face of the first lens is provided with a third side face part between a first side face part, which is extended from an outer edge of an object side face (first face) of the first lens toward an image side, and a second side face part which is extended from the object side toward the image side on the image side with respect to the first side face part and on an outer side in the radial direction with respect to the first side face part. Further, the holder is provided with a caulked part which covers the third side face part from the object side at an object side end part of the first lens holding tube part surrounding a periphery of the second side face part. An inner side end part in the radial direction of the caulked part is located on the image side with respect to a virtual extended face which is obtained by extending the first face to an outer side in the radial direction. Therefore, when a high pressure water flow is ejected to the first lens from the object side, the water flow flows to an outer side in the radial direction along the first lens face and the virtual extended face and thus, a situation is hard to occur that the water flow hits the inner side end part in the radial direction of the caulked part from an inner side in the radial direction with strong pressure. Accordingly, water is hard to enter between the side face of the first lens and the first lens holding tube part of the holder. Further, deformation to an outer side in the radial direction and damage due to water pressure are hard to occur in the inner side end part in the radial direction of the caulked part. Therefore, waterproof performance between the first lens and the holder can be enhanced.

DESCRIPTION OF EMBODIMENTS

Embodiments of the present invention will be described below with reference to the accompanying drawings. In the views which are referred in the following descriptions, the numbers and the scales of respective members are shown to be different so that the respective members have sizes capable of being recognized in the drawings. Further, in the following descriptions, in a direction that an optical axis "L" is extended, "La" is indicated on an object side and "Lb" is indicated on an image side. Further, in the following descriptions, the same reference signs as those in FIG. 8 are used in corresponding portions for easily understanding correspondence with the example described with reference to FIG. 8.

First Embodiment (Structure of Lens Unit)

Figure 1:
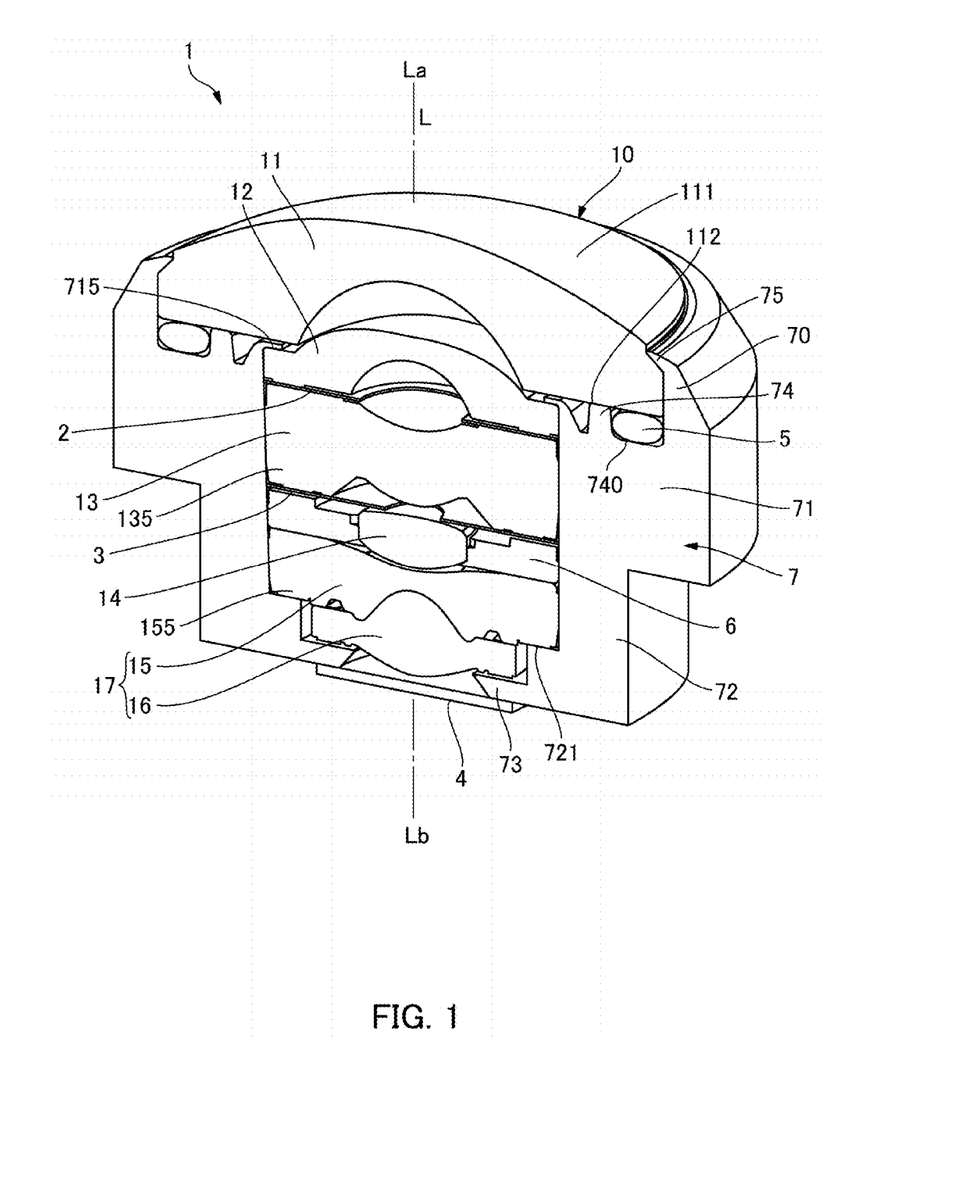
FIG. 1 is a perspective view showing a lens unit in accordance with a first embodiment of the present invention in which a part of the lens unit is cut out and viewed from an object side.

FIG. 1 is a perspective view showing a lens unit 1 in accordance with a first embodiment of the present invention in which a part of the lens unit 1 is cut out and viewed from an object side. As shown in FIG. 1, a lens unit 1 in this embodiment includes a wide-angle lens 10 comprised of a plurality of lenses disposed in an optical axis "L" direction and a tube-shaped holder 7 which holds the wide-angle lens 10 on an inner side, and the lens unit 1 is used in an optical device such as an imaging device. In this embodiment, the holder 7 is made of light shielding resin.

The wide-angle lens 10 has, for example, a 5-group 6-piece lens configuration. More specifically, the wide-angle lens 10 is, from the object side "La" (object to be photographed side/front side) toward the image side "Lb", configured of a first lens 11 having negative power, a second lens 12 having negative power, a third lens 13 having positive or negative power, a fourth lens 14 having positive power, and a cemented lens 17 (fifth lens 15 and sixth lens 16) having positive power. The first lens 11 is a glass lens or plastic lens and, in this embodiment, the first lens 11 is a glass lens.

The second lens 12 and the third lens 13 are plastic lenses. The fourth lens 14 is a glass lens. The cemented lens 17 is a lens cemented of the fifth lens 15 which is a plastic lens having negative power and the sixth lens 16 which is a plastic lens having positive power. The lens unit 1 includes a light shielding sheet 2 in a circular ring shape between the second lens 12 and the third lens 13 and a diaphragm 3 in a circular ring shape between the third lens 13 and the fourth lens 14. Further, the lens unit 1 includes an infrared ray cut filter 1 on the image side "Lb" with respect to the cemented lens 17.

(Configuration of Holder 7 and the Like)

An outer diameter of the first lens 11 is larger than those of the second lens 12, the third lens 13, the fourth lens 14 and the cemented lens 17. Outer diameters of the second lens 12, the third lens 13 and the cemented lens 17 are substantially equal to each other and, in the cemented lens 17, an outer shape of the fifth lens 15 is larger than the sixth lens 16. An outer diameter of the fourth lens 14 is smaller than those of the second lens and the like.

Corresponding to these shapes, the holder 7 is provided with a first lens holding tube part 70 which surrounds a periphery of the first lens 11 on the most object side "La", a first tube part 71 which is extended toward the image side "Lb" from the first lens holding tube part 70, a second tube part 72 which is extended toward the image side "Lb" from the first tube part 71, and a projected part 73 which is projected to an inner side in a radial direction at an end part on the image side "Lb" of the second tube part 72. Inside diameters of the first tube part 71 and the second tube part 72 are equal to each other and an inside diameter of the first lens holding tube part 70 is larger than those of the first tube part 71 and the second tube part 72. Therefore, a ring-shaped step part 74 facing the object side "La" is formed between an inner circumferential face of the first lens holding tube part 70 and an inner circumferential face of the first tube part 71. A ring-shaped groove 740 is formed in the step part 74 and a seal member 5 in a ring shape is disposed on an inner side of the groove 740. An inner circumferential face of the second tube part 72 is formed with a ring-shaped step part 721 which is projected toward an inner side in the radial direction and faces the object side "La" at a midway position in the optical axis "L" direction.

A flange part 155 of the fifth lens 15 is abutted from the object side "La" with the step part 721 of the holder 7 configured as described above. The fourth lens 14 is held by a lens barrel 6, and the lens barrel 6 is abutted with the flange part 155 of the fifth lens 15 from the object side "La". A flange part 135 of the third lens 13 is abutted with the lens barrel 6 from the object side "La" through the diaphragm 3. A flange part 125 of the second lens 12 is abutted with the flange part 135 of the third lens 13 from the object side "La" through the light shielding sheet 2.

The flange part 125 of the second lens 12 is covered from the object side "La" with a caulked part 715 which is formed so that an end part on the object side "La" of an inner circumferential face of the first tube part 71 is plastically deformed to an inner side in the radial direction and thereby movement of the second lens 12 to the object side "La" is restricted. As a result, the second lens 12, the light shielding sheet 2, the third lens 13, the diaphragm 3, the fourth lens 14 and the cemented lens 17 are held in an inside of the first tube part 71 and the second tube part 72.

(Fixing Configuration of First Lens 1)

Figure 2:
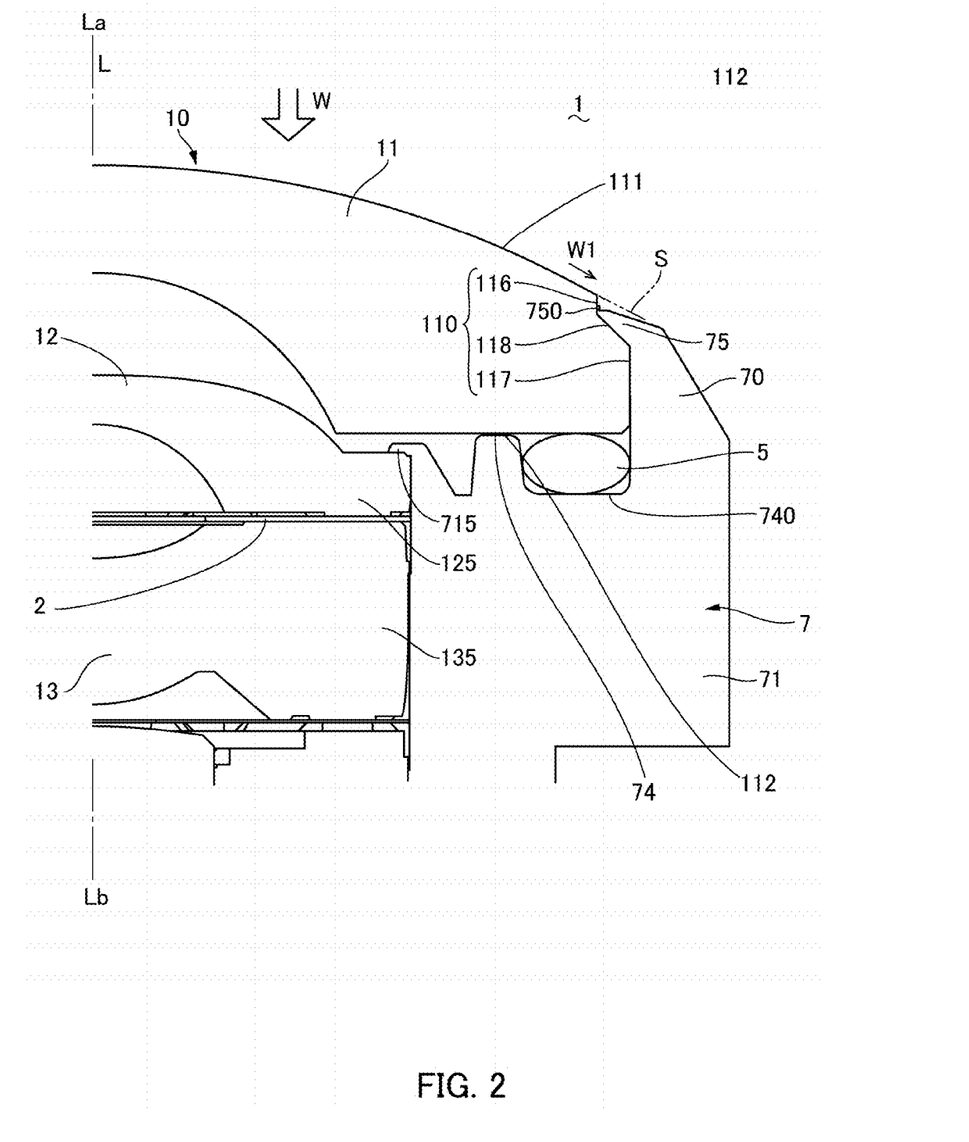
FIG. 2 is an enlarged cross-sectional view showing surroundings of a first lens of the lens unit shown in FIG. 1.
Figure 3:
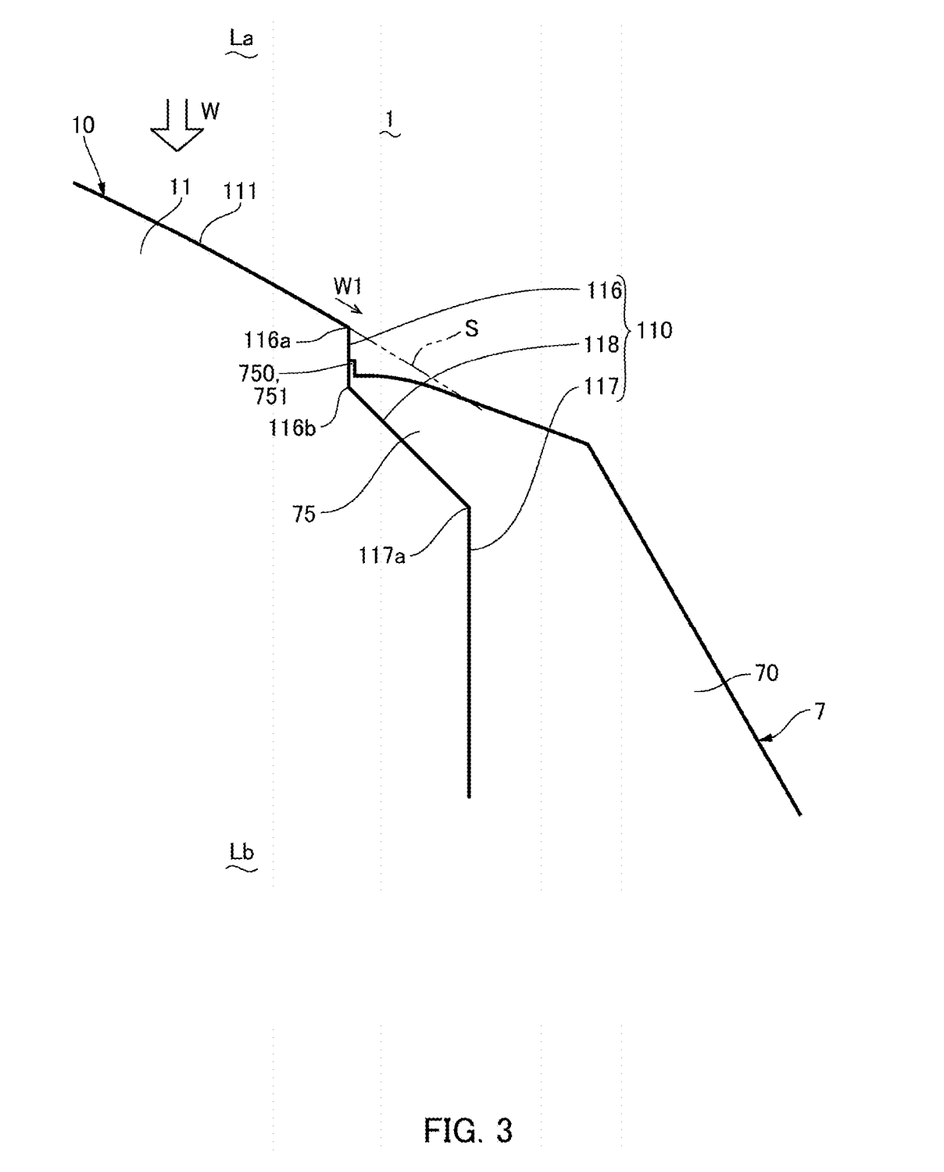
FIG. 3 is an enlarged cross-sectional view showing surroundings of a caulked part to a first lens of the lens unit shown in FIG. 1.

FIG. 2 is an enlarged cross-sectional view showing surroundings of the first lens 11 of the lens unit 1 shown in FIG. 1. FIG. 3 is an enlarged cross-sectional view showing surroundings of a caulked part 75 to the first lens 11 of the lens unit 1 shown in FIG. 1.

As shown in FIG. 1 and FIG. 2, the holder 7 is provided with a caulked part 75 which fixes the first lens 11 on an inner side of the first lens holding tube part 70. The caulked part 75 is a portion which is formed so that a rib (not shown) having been formed at an end part on the object side "La" of the first lens holding tube part 70 is heated and plastically deformed to an inner side in the radial direction so as to cover an outer peripheral portion of the first lens 11 from the object side "La". In this state, a second face 112 which is a face on the image side "Lb" of the first lens 11 is abutted with the step part 74 and positioned in the optical axis "L" direction. Further, the second face 112 of the first lens 11 is abutted with the ring-shaped seal member 5 from the object side "La", and a space between the second face 112 of the first lens 11 and the holder 7 is sealed by the seal member 5. In this embodiment, the second face 112 of the first lens 11 is formed with a light shielding layer (not shown) on an outer peripheral side with respect to the lens face.

In order to adopt a fixing configuration which utilizes the caulked part 75, as shown in FIG. 3, a side face 110 of the first lens 11 is provided with a first side face part 116 extended toward the image side "Lb" from an outer edge of a first face 111 which is a face on the object side "La" of the first lens 11, a second side face part 117 which is extended toward the image side "Lb" from the object side "La" on the image side "Lb" with respect to the first side face part 116 and on an outer side in the radial direction with respect to the first side face part 116, and a third side face part 118 which connects an image side end part 116b of the first side face part 116 and an object side end part 117a of the second side face part 117. In this embodiment, the first side face part 116 and the second side face part 117 are extended in substantially parallel to the optical axis "L", and the first lens holding tube part 70 surrounds a periphery of the second side face part 117. The third side face part 118 is formed to be an inclined face which is inclined so as to form an angle of 30° through 70° with respect to the optical axis "L". The first side face part 116, the second side face part 117 and the third side face part 118 are formed in ring shapes over the entire peripheries.

The caulked part 75 is formed so as to obliquely incline to an inner side in the radial direction and cover the third side face part 118 from an end part on the object side "La" of the first lens holding tube part 70 over the entire periphery, and the caulked part 75 covers the third side face part 118 from the object side "La". In this embodiment, an inner side end part 750 in the radial direction of the caulked part 75 is located on the image side "Lb" at any point in a circumferential direction with respect to a virtual extended face "S" which is obtained by extending an object side "La" face (first face 111) of the first lens 11 to an outer side in the radial direction.

In this embodiment, the inner side end part 750 in the radial direction of the caulked part 75 covers the first side face part 116 from an outer side in the radial direction at any point in the circumferential direction. Also in this case, the inner side end part 750 in the radial direction of the caulked part 75 covers a portion of the first side face part 116 which is separated from the object side end part 116a to the image side "Lb". Therefore, the inner side end part 750 is located on the image side "Lb" with respect to the virtual extended face "S" which is obtained by extending the object side "La" face (first face 111) of the first lens 11 to the outer side in the radial direction.

Further, the inner side end part 750 in the radial direction of the caulked part 75 is provided with a protruded part 751 which is protruded to the object side "La" along the first side face part 116 and covers the first side face part 116 from an outer side in the radial direction, and the protruded part 751 is extended in a circumferential direction. In this embodiment, the protruded part 751 covers at a position separated from the object side end part 116a of the first side face part 116 to the image side "Lb". Therefore, the protruded part 751 is located on the image side "Lb" with respect to the virtual extended face "S" which is obtained by extending the object side "La" face (first face 111) of the first lens 11 to the outer side in the radial direction. The protruded part 751 is formed in a ring shape over the entire periphery.

(Principal Effects in this Embodiment)

As described above, in the lens unit 1 in this embodiment, the side face 110 of the first lens 11 is provided with the third side face part 118 between the first side face part 116, which is extended from an outer edge of the object side "La" face (first face 111) of the first lens 11 toward the image side "Lb", and the second side face part 117 which is extended from the object side "La" toward the image side "Lb" on the image side "Lb" with respect to the first side face part 116 and on the outer side in the radial direction with respect to the first side face part 116. On the other hand, the holder 7 is provided with the caulked part 75 which covers the third side face part 118 at an end part on the object side "La" of the first lens holding tube part 70 surrounding the periphery of the second side face part 117. Further, the inner side end part 750 in the radial direction of the caulked part 75 is located on the image side "Lb" with respect to the virtual extended face "S" which is obtained by extending the first face 111 to an outer side in the radial direction. Therefore, when a high pressure water flow "W" is ejected to the first lens 11 from the object side "La", the water flow flows to an outer side in the radial direction along the first face 111 and the virtual extended face "S" as shown by the arrow "W1" and thus, a situation is hard to occur that the water flow hits the inner side end part 750 in the radial direction of the caulked part 75 from an inner side in the radial direction with strong pressure. Therefore, water is hard to enter between the side face 110 of the first lens 11 and the first lens holding tube part 70 of the holder 7. Further, deformation to an outer side in the radial direction and damage due to water pressure are hard to occur in the inner side end part 750 in the radial direction of the caulked part 75. Therefore, waterproof performance between the first lens 11 and the holder 7 can be enhanced.

Further, the inner side end part 750 in the radial direction of the caulked part 75 covers the first side face part 116 from an outer side in the radial direction and thus, there is no space between the inner side end part 750 in the radial direction and the first side face part 116. Therefore, when a high pressure water flow "W" is ejected to the first lens 11 from the object side "La", the water flow hardly hits the inner side end part 750 in the radial direction of the caulked part 75 from an inner side in the radial direction with strong pressure. Further, the caulked part 75 covers the first side face part 116 of the first lens 11 and thus, light causing stray light is hard to be incident on the first lens 11 from the side face 110 of the first lens 11.

Especially, in this embodiment, the inner side end part 750 in the radial direction of the caulked part 75 is provided with the protruded part 751 which is protruded to the object side "La" along the first side face part 116 and covers the first side face part 116 of the first lens 11 from an outer side in the radial direction. Therefore, light causing stray light is hard to be incident on the first lens 11 from the side face 110 of the first lens 11. Also in this case, the protruded part 751 is located on the image side "Lb" with respect to the virtual extended face "S" which is obtained by extending the object side "La" face (first face 111) of the first lens 11 to an outer side in the radial direction and thus, when a high pressure water flow "W" is ejected to the first lens 11 from the object side "La", a situation is hard to occur that the water flow hits the protruded part 751 of the caulked part 75 from an inner side in the radial direction with strong pressure. Therefore, deformation and damage due to water pressure are hard to occur in the inner side end part 750 in the radial direction of the caulked part 75 and thus, waterproof performance between the first lens 11 and the holder 7 can be enhanced.

Further, the third side face part 118 is formed to be an inclined face which is obliquely inclined with respect to the optical axis "L" and thus, when an end part on the object side "La" of the first lens holding tube part 70 is plastically deformed to form the caulked part 75, the caulked part 75 is easily formed in a shape along a shape of the side face 110 of the first lens 11.

Second Embodiment

Figure 4:
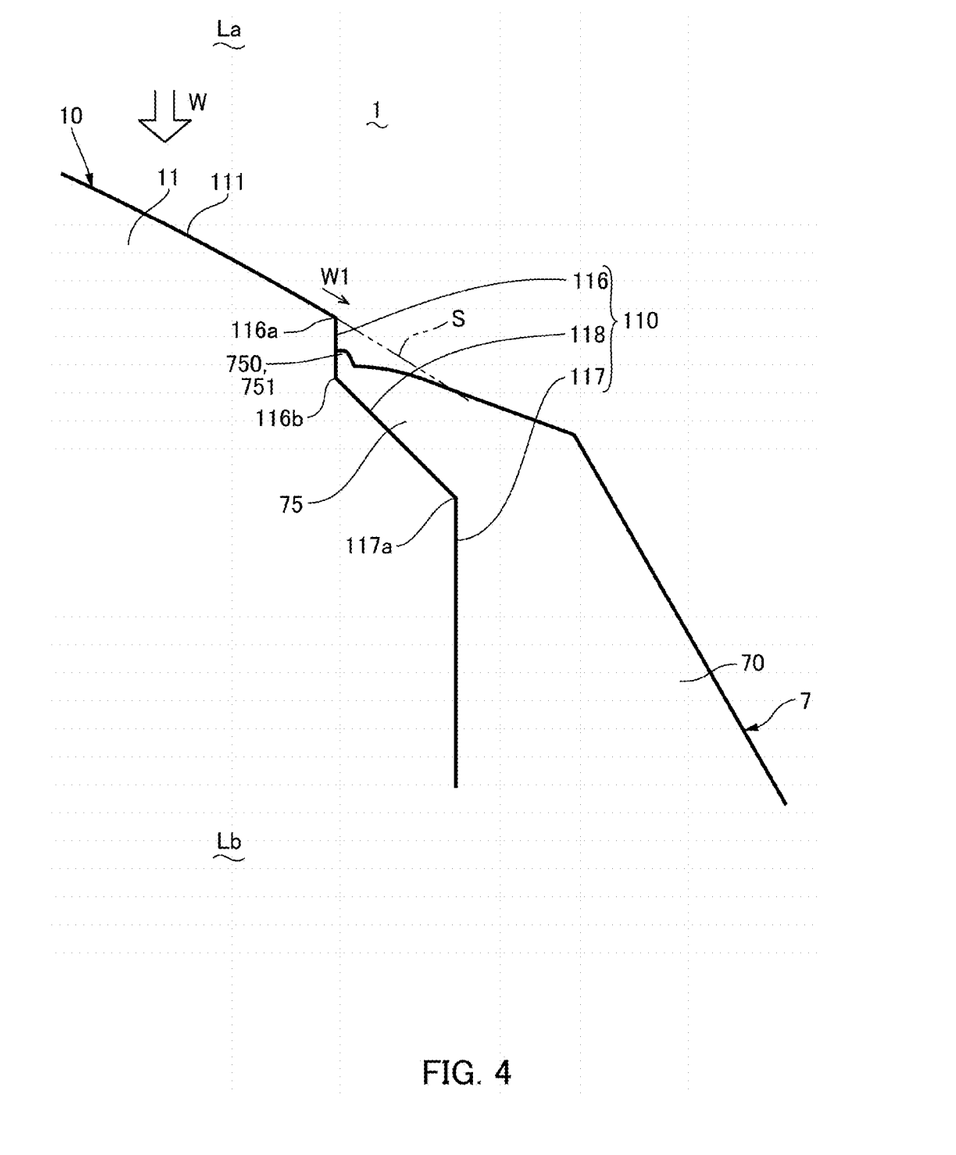
FIG. 4 is an enlarged cross-sectional view showing surroundings of a caulked part to a first lens of a lens unit in accordance with a second embodiment of the present invention.

FIG. 4 is an enlarged cross-sectional view showing surroundings of a caulked part 75 to a first lens 11 of a lens unit 1 in accordance with a second embodiment of the present invention. In each of this embodiment and embodiments described below, basic configurations are the same as each other and thus, the same reference signs are used in common portions and their descriptions are omitted.

In the first embodiment, the protruded part 751 formed in the inner side end part 750 in the radial direction of the caulked part 75 is extremely thin in comparison with the other portion of the caulked part 75. However, as shown in FIG. 4, a configuration may be adopted that a protruded part 751 is comparatively thick and an outer peripheral face of the protruded part 751 is formed to be an inclined face. Also in this case, the protruded part 751 is located on the image side "Lb" with respect to a virtual extended face "S" which is obtained by extending an object side "La" face (first face 111) of the first lens 11 to an outer side in the radial direction and thus, similar effects to the first embodiment are attained, for example, deformation and damage due to water pressure are hard to occur in the inner side end part 750 in the radial direction of the caulked part 75.

Third Embodiment

Figure 5:
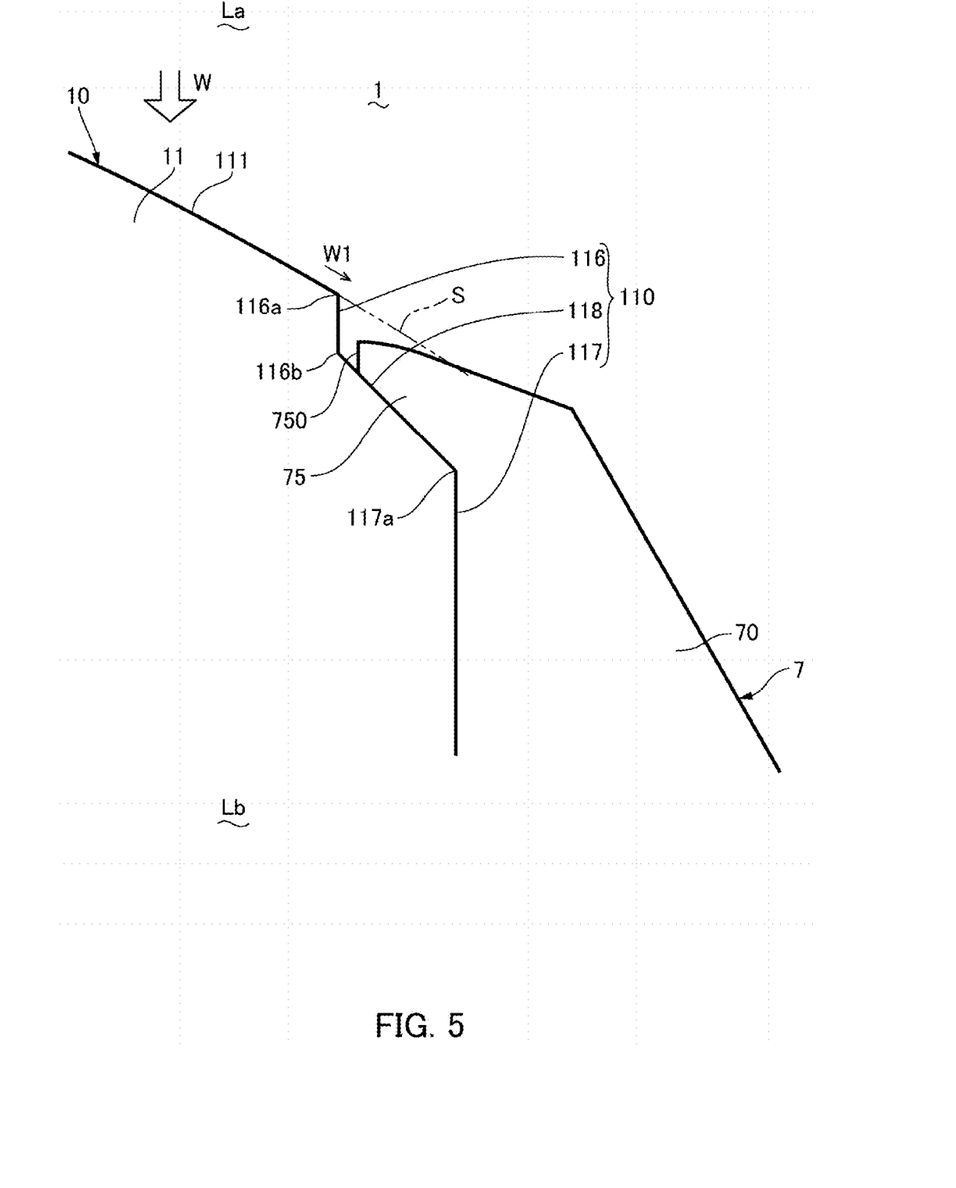
FIG. 5 is an enlarged cross-sectional view showing surroundings of a caulked part to a first lens of a lens unit in accordance with a third embodiment of the present invention.

FIG. 5 is an enlarged cross-sectional view showing surroundings of a caulked part 75 to a first lens 11 of a lens unit 1 in accordance with a third embodiment of the present invention. In the first and second embodiments, the inner side end part 750 in the radial direction of the caulked part 75 covers the first side face part 116 from an outer side in the radial direction. However, as shown in FIG. 5, an inner side end part 750 in the radial direction of a caulked part 75 may be located at a position separated toward an outer side in the radial direction from a first side face part 116. Also in this embodiment, the inner side end part 750 in the radial direction of the caulked part 75 is located on the image side "Lb" with respect to a virtual extended face "S" which is obtained by extending a first face 111 to an outer side in the radial direction. Therefore, similar effects to the first embodiment are attained, for example, when a high pressure water flow "W" is ejected to the first lens 11 from the object side "La", a situation is hard to occur that the water flow hits the inner side end part 750 in the radial direction of the caulked part 75 from an inner side in the radial direction with strong pressure.

Fourth Embodiment

Figure 6:
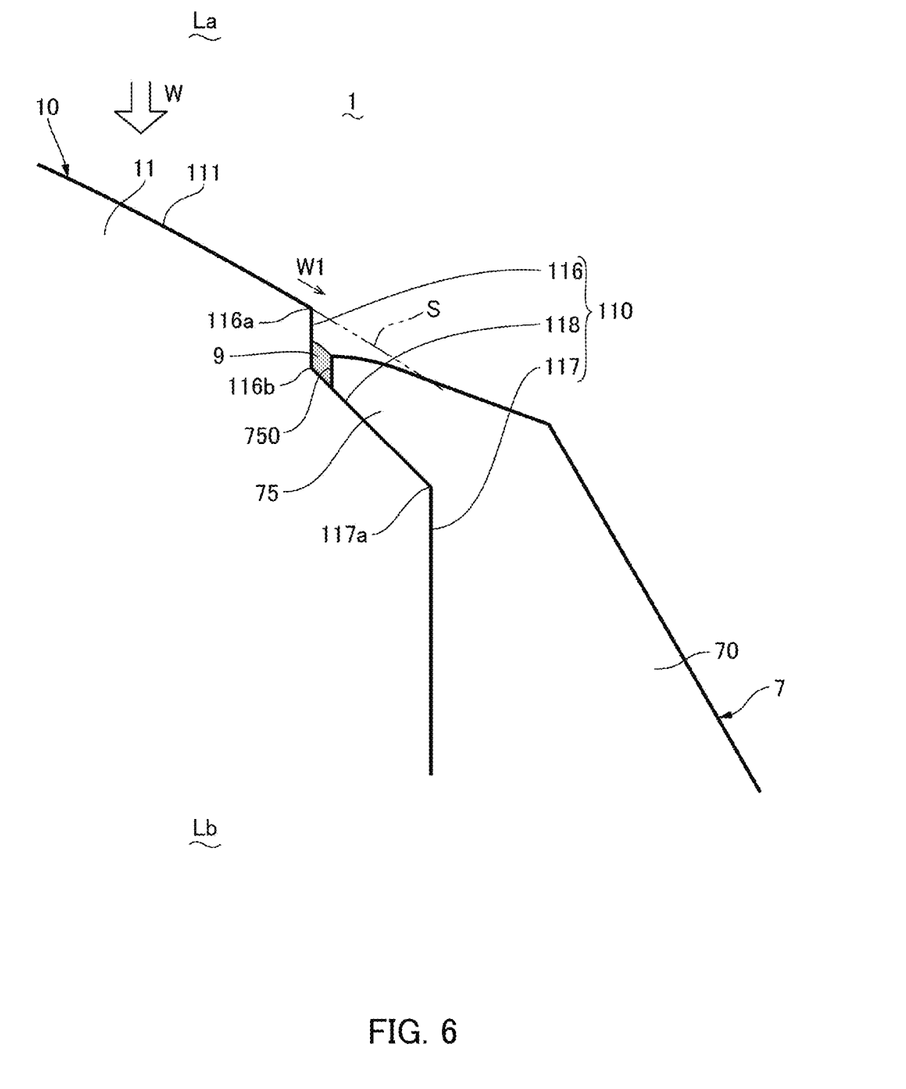
FIG. 6 is an enlarged cross-sectional view showing surroundings of a caulked part to a first lens of a lens unit in accordance with a fourth embodiment of the present invention.

FIG. 6 is an enlarged cross-sectional view showing surroundings of a caulked part 75 to a first lens 11 of a lens unit 1 in accordance with a fourth embodiment of the present invention. In this embodiment, as shown in FIG. 6, an inner side end part 750 in the radial direction of a caulked part 75 is located at a position separated toward an outer side in the radial direction from a first side face part 116. An adhesive 9 is filled in a space between the inner side end part 750 in the radial direction of the caulked part 75 and the first side face part 116, and the space between the inner side end part 750 in the radial direction of the caulked part 75 and the first side face part 116 is filled with the adhesive 9. Therefore, the adhesive 9 covers the first side face part 116 on an outer side in the radial direction.

In this embodiment, the adhesive 9 has a light shielding property. Therefore, light causing stray light is hard to be incident on a first lens 11 from a side face 110 of the first lens 11. Further, the adhesive 9 is located on the image side "Lb" with respect to a virtual extended face "S" which is obtained by extending a first face 111 to an outer side in the radial direction. Therefore, when a high pressure water flow "W" is ejected to the first lens 11 from the object side "La", a situation is hard to occur that the water flow hits the adhesive 9 from an inner side in the radial direction with strong pressure and thus, separation or the like of the adhesive 9 is hard to occur.

Fifth Embodiment

Figure 7:
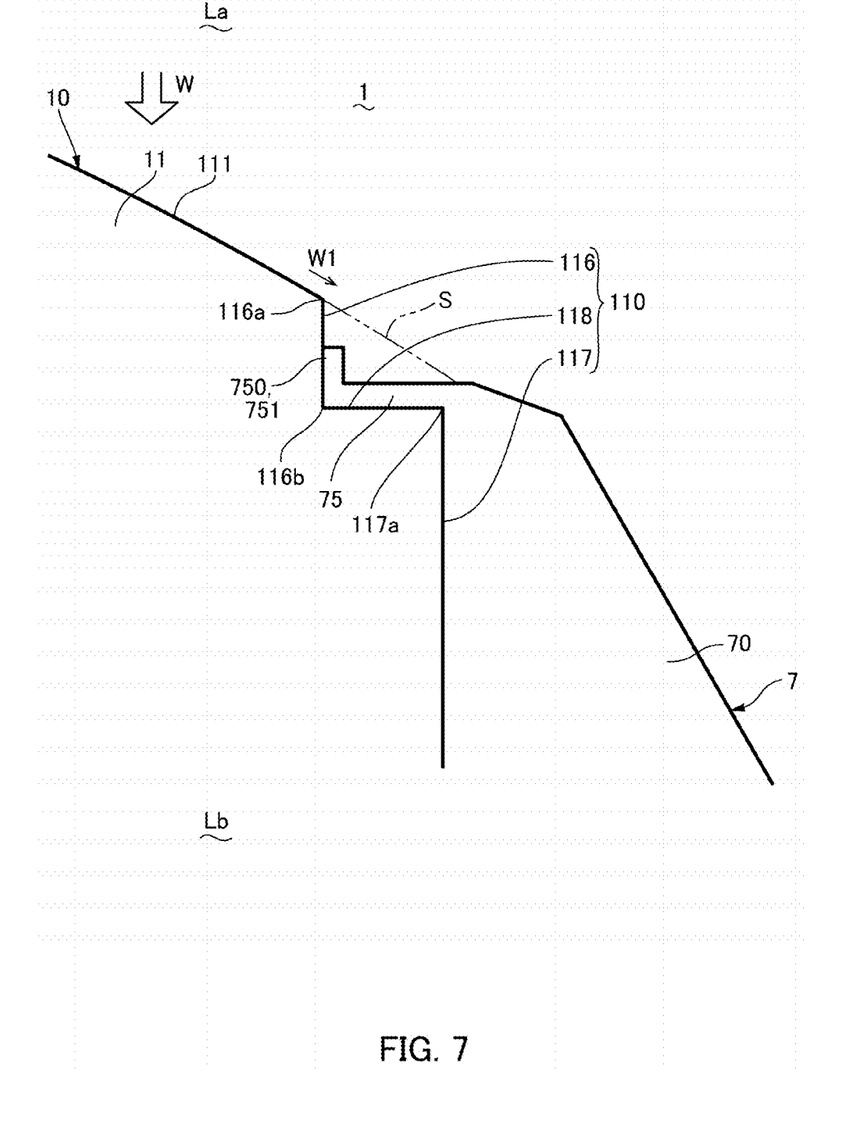
FIG. 7 is an enlarged cross-sectional view showing surroundings of a caulked part to a first lens of a lens unit in accordance with a fifth embodiment of the present invention.

FIG. 7 is an enlarged cross-sectional view showing surroundings of a caulked part 75 to a first lens 11 of a lens unit 1 in accordance with a fifth embodiment of the present invention. In the first embodiment and the like, the third side face part 118 is formed to be an inclined face which is obliquely inclined with respect to the optical axis "L". However, in this embodiment, as shown in FIG. 7, a third side face part 118 is a face perpendicular to the optical axis "L". Also in this embodiment, an inner side end part 750 in the radial direction (protruded part 751) of a caulked part 75 is located on the image side "Lb" with respect to a virtual extended face "S" which is obtained by extending an object side "La" face (first face 111) of the first lens 11 to an outer side in the radial direction. Therefore, when a high pressure water flow "W" is ejected to the first lens 11 from the object side "La", a situation is hard to occur that the water flow hits the protruded part 751 of the caulked part 75 from an inner side in the radial direction with strong pressure and thus, deformation and damage due to the water pressure are hard to occur in the inner side end part 750 in the radial direction of the caulked part 75.

Other Embodiments

In the embodiments described above, the caulked part 75 is formed in a ring shape so as to surround the lens face of the first lens 11 over the entire periphery. However, the present invention may be applied to a case that a caulked part 75 is formed in a circular arc shape at a plurality of positions in a circumferential direction.

In the embodiments described above, the present invention is applied to the lens unit 1 having a 5-group 6-piece lens configuration. However, the present invention may be applied to a lens unit 1 having a 3-group 3-piece, 4-group 4-piece, 5-group 6-piece, or 6-group 7-piece lens configuration or the like, and the present invention is not limited to a lens configuration.

REFERENCE SIGNS LIST

1 . . . lens unit, 5 . . . seal member, 7 . . . holder, 9 . . . adhesive, 10 . . . wide-angle lens, 11 . . . first lens, 12 . . . second lens, 70 . . . first lens holding tube part, 71 . . . first tube part, 72 . . . second tube part, 74 . . . step part, 75 . . .

caulked part, 110 . . . side face, 111 . . . first face, 112 . . . second face, 116 . . . first side face part, 117 . . . second side face part, 118 . . . third side face part, 750 . . . inner side end part in radial direction, 751 . . . protruded part, "L" . . . optical axis, "La" . . . object side, "Lb" . . . image side

The invention claimed is:

1. A lens unit comprising:
a plurality of lenses disposed in a direction of an optical axis; and
a holder in a tube shape which holds the plurality of lenses on an inner side;
wherein in the plurality of lenses, a side face of a first lens located on a most object side comprises:
a first side face part which is extended from an outer edge of a first face that is an object side face of the first lens toward an image side;
a second side face part which is extended from an object side toward the image side on the image side with respect to the first side face part and an outer side in a radial direction with respect to the first side face part; and
a third side face part which connects an image side end part of the first side face part with an object side end part of the second side face part, the third side face part being formed to be an inclined face which is obliquely inclined with respect to the optical axis;
wherein the holder made of light shielding resin comprising:
a first lens holding tube part which surrounds a periphery of the second side face part; and
a caulked part which covers the third side face part of the first lens from the object side at an object side end part of the first lens holding tube part; and
wherein the first side face part is extended in substantially parallel to the optical axis from the outer edge of the first face and thereby, an inner side end part in the radial direction of the caulked part is located at a separated position in the direction of the optical axis on the image side from a virtual extended face which is obtained by extending the first face to the outer side in the radial direction.

2. The lens unit according to claim 1, wherein the inner side end part in the radial direction of the caulked part covers the first side face part from the outer side in the radial direction.

3. The lens unit according to claim 2, wherein the inner side end part in the radial direction of the caulked part is protruded to the object side along the first side face part.

4. The lens unit according to claim 1, wherein the inner side end part in the radial direction of the caulked part is located at a position separated from the first side face part toward the outer side in the radial direction.

5. The lens unit according to claim 4, wherein
an adhesive is filled in a space between the inner side end part in the radial direction of the caulked part and the first side face part, and
the adhesive is located on the image side with respect to the virtual extended face.

6. The lens unit according to claim 5, wherein the adhesive has a light shielding property.

7. The lens unit according to claim 1, wherein a ring-shaped seal member is disposed between a second face which is an image side face of the first lens and the holder.

* * * * *